United States Patent
Hsu et al.

(10) Patent No.: US 10,891,410 B1
(45) Date of Patent: Jan. 12, 2021

(54) USER-DEFINED RULE ENGINE

(71) Applicant: SYNOPSYS, INC., Mountain View, CA (US)

(72) Inventors: Chin-Hsiung Hsu, Hsinchu (TW); Philip Hui-Yuh Tai, Mountain View, CA (US); Sheng-Wei Yang, Hsinchu (TW); Guo-Ting Wang, Hsinchu (TW)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/503,292

(22) Filed: Jul. 3, 2019

Related U.S. Application Data

(60) Provisional application No. 62/693,697, filed on Jul. 3, 2018.

(51) Int. Cl.
  *G06F 30/30* (2020.01)
  *G06F 16/901* (2019.01)
  *G06F 21/60* (2013.01)

(52) U.S. Cl.
  CPC .......... *G06F 30/30* (2020.01); *G06F 16/9024* (2019.01); *G06F 21/602* (2013.01)

(58) Field of Classification Search
  USPC ........................................................ 716/101
  See application file for complete search history.

(56) References Cited

U.S. PATENT DOCUMENTS

| | | | |
|---|---|---|---|
| 7,353,468 B2 | 4/2008 | Ferguson et al. | |
| 8,769,475 B2 | 7/2014 | Chen et al. | |
| 2007/0124709 A1 | 5/2007 | Li et al. | |
| 2007/0168730 A1* | 7/2007 | Memmi | G06F 30/33 714/30 |
| 2010/0325597 A1 | 12/2010 | Arsintescu | |
| 2014/0215415 A1* | 7/2014 | Wang | G06F 30/398 716/52 |
| 2017/0345490 A1* | 11/2017 | Yoshimoto | G11C 11/5642 |

OTHER PUBLICATIONS

Virtuoso Schematic Editor L and L, Fast, Easy-to-Use Design and Constraint Entry, Cadence, available at www.cadence.com, (2014).

* cited by examiner

*Primary Examiner* — Bryce M Aisaka
(74) *Attorney, Agent, or Firm* — Alston & Bird LLP

(57) ABSTRACT

In an example embodiment, a computer-implemented method is provided for receiving an integrated circuit design, wherein the integrated circuit design comprises at least one position in violation of one or more design rules associated with the integrated design, identifying one or more design patterns at the at least one violating position, generating one or more pattern graphs for the one or more design patterns, extracting a system on chip design for transformation into a block graph, and. comparing the block graph with each of the one or more pattern graphs to determine whether the at least one violating position is cleared. In circumstances where a match is found between the block graph and the each of the one or more pattern graphs, the computer-implemented method further comprises changing the one or more design patterns and repeating the step of comparing until there is no further match found.

20 Claims, 11 Drawing Sheets

File format of Input Pattern File

USER-DEFINED RULE ENGINE

CROSS-REFERENCE TO RELATED APPLICATIONS

This patent application claims priority from U.S. Provisional Appl. Ser. No. 62/693,697, filed Jul. 3, 2018, all of which are incorporated herein by reference in its entirety.

COPYRIGHT NOTICE

The assignee of this patent document has no objection to the facsimile reproduction by anyone of the patent document itself, or of the patent application, as it appears in the files of the United States Patent and Trademark Office, but otherwise reserves all rights whatsoever in any included works of authorship protected by copyright.

SPECIFICATION—DISCLAIMERS

In the following Background, Summary, and Detailed Description, headings should not be construed as necessarily limiting. In the following Background, Summary and Detailed Description, the citation or identification of any publication does not signify relevance or status as prior art for any of the claimed or described embodiments. Paragraphs for which the text is all italicized signifies text that is common to multiple Synopsys patent specifications.

A writing enclosed in double quotes (" ") signifies an exact copy of a writing that has been expressed as a work of authorship. Signifiers such as a word or a phrase enclosed in single quotes (' ') signifies a term to be defined that it is not to be evaluated for, or has no, meaning in that specific use (for example, when the term 'module' is first defined).

FIELD(S) OF TECHNOLOGY

The following information is solely for use in searching the prior art. This disclosure has significance in the field of electronics in general, including the following topics: 3$^{rd}$ party Electronic Design Automation (EDA) tools.

BACKGROUND

With advances in semiconductor technology and specifically in development of technology nodes, foundries and design houses (collectively defined as 'customers') rely more and more on EDA tools to design next-generation circuits for fabrication of process nodes ahead of their competitors. Because of the complexity of developing new nodes, there are often frequent requests for software enhancements to the tools to support new and evolving design rules, especially during the development stage.

In the existing working model to implement enhancements, customers file a request to software providers for each new enhancement. However, since issuing official requests to software suppliers for enhancement support oftentimes involves intellectual property disclosure, the enhancement requests are usually described in an abstruse and unfathomable fashion to avoid disclosing key know-how and trade secrets (collectively "proprietary information"). Such a working model results in considerably long turn-around time as software providers are forced to spend a large portion of resources in order to understand the enhancement requests.

Furthermore, even after successfully comprehending customer specifications, EDA software suppliers still spend significant time enhancing their software before releasing it to their customers.

In iDRM: Fixing the Broken Interface Between Design and Manufacturing, by Sage Design Automation, INC, Santa Clara, Calif., Available at: http://www.sageda.com/images/doc/sage_iDRM_WP1_R2_15062017.pdf.—an Integrated Design Rule Management (iDRM) rule capture tool is discussed that allows process engineers to immediately verify that their design rule accurately matches the process limitations they are trying to capture. iDRM scans the layout and finds all instances in the layout using a similar pattern to the one captured in the design rule and provides a report in graphical and/or table formats. In Calibre Pattern Matching: Picture it, Match it . . . Done! By Mark Simmons, Jonathan Muirhead, and Michael White, available at https://pdfs.semanticscholar.org/6bed/0092aef5b7a3ebfa8c2ba3d16fe89c525d4c.pdf, failure analysis teams are able to identify specific geometric patterns directly from a design layout. These identified patterns can be added to a pattern library that can be used by the Calibre Pattern Matching engine to automatically scan designs for matching patterns. The scanned designs can be adjusted by the user.

SUMMARY

This Summary is a prelude to the Detailed Description. This Summary, together with the independent Claims, signifies a brief writing about at least one claimed invention (which can be a discovery, see 35 USC 100(a); and see 35 USC 100(j)), for use in commerce that is enabled by the Specification and Drawings.

Accordingly, in order to provide a mechanism for integrated circuit design, testing, and/or manufacturing, exemplary embodiments of the present invention provide a computer-implemented method, a non-transitory storage medium and computer system for integrated circuit design, testing, and/or manufacturing.

In an example embodiment, a computer system comprising one or more non-abstract modules for integrated circuit design, testing, and/or manufacturing, the computer system configured to receive an integrated circuit design, wherein the integrated circuit design comprises at least one position in violation of one or more design rules associated with the integrated design, identify one or more design patterns at the at least one violating position, generate one or more pattern graphs for the one or more design patterns, extract a system on chip (SoC) design for transformation into a block graph, and compare the block graph with each of the one or more pattern graphs to determine whether the at least one violating position is cleared. In circumstances where a match is found between the block graph and the each of the one or more pattern graphs, the computer system is further configured to change the one or more design patterns and repeat the step of comparing until there is no further match found.

In another example embodiment, a computer-implemented method is provided. The computer-implemented method comprises receiving an integrated circuit design, wherein the integrated circuit design comprises at least one position in violation of one or more design rules associated with the integrated design, identifying one or more design patterns at the at least one violating position, generating one or more pattern graphs for the one or more design patterns, extracting a system on chip (SoC) design for transformation into a block graph, and comparing the block graph with each of the one or more pattern graphs to determine whether the at least one violating position is cleared. In circumstances where a match is found between the block graph and the each of the one or more pattern graphs, the method further comprises changing the one or more design patterns and repeating the step of comparing until there is no further match found.

In yet another example embodiment, a storage medium comprising instructions to be executed by a computer for integrated circuit design, testing, and/or manufacturing, the storage medium on executing the instructions the computer: receives an integrated circuit design, wherein the integrated circuit design comprises at least one position in violation of one or more design rules associated with the integrated design, identifies one or more design patterns at the at least one violating position, generates one or more pattern graphs for the one or more design patterns, extracts a system on chip (SoC) design for transformation into a block graph, and compares the block graph with each of the one or more pattern graphs to determine whether the at least one violating position is cleared. In circumstances where a match is found between the block graph and the each of the one or more pattern graphs, the computer changes the one or more design patterns and repeat the step of comparing until there is no further match found.

DRAWING(S)

The following Detailed Description, Figures, and Claims signify the uses and advantages of the claimed inventions, and their embodiments. All of the Figures are used only to provide knowledge and understanding and do not limit the scope of the claimed inventions and their embodiments. Such Figures are not necessarily drawn to scale.

Similar components or features used in the Figures can have the same, or similar, reference signs in the form of labels (such as alphanumeric symbols, e.g., reference numerals), and can signify a similar or equivalent use. Further, various components of the same type can be distinguished by following the reference label by a dash and a second label that distinguishes among the similar components. If only the first reference label is used in the Specification, its use applies to any similar component having the same first reference label irrespective of the second reference label. A brief description of the Figures is below.

Figure 1:
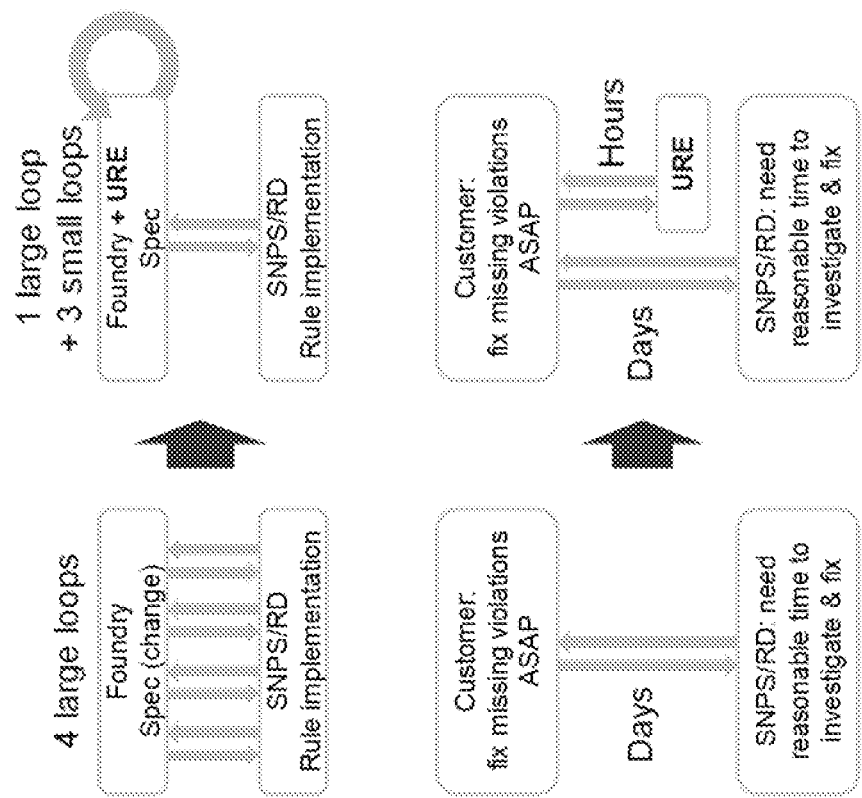
FIG. 1 illustrates how foundries have many advanced design rules that should be honored by EDA software suppliers and to implement the design rules to make EDA tools meet those rules.

In such various figures, reference signs may be omitted as is consistent with accepted engineering practice; however, one of ordinary skill in the art will understand that the illustrated components are readily understood when viewed in context of the illustration as a whole and the accompanying disclosure describing such various figures.

DETAILED DESCRIPTION

The Figures and the following Detailed Description signify innovations, embodiments and/or examples by way of illustration only, with various features, structures or characteristics described together in a single embodiment to streamline the disclosure. Variations of any of the elements, processes, machines, systems, manufactures or compositions disclosed by such exemplary innovations, embodiments and/or examples will be readily recognized and may be used in commerce without departing from the principles of what is claimed. The Figures and Detailed Description may also signify, implicitly or explicitly, advantages and improvements of a subset of the exemplary embodiments described herein.

In the Figures and Detailed Description, numerous specific details may be described to enable one or more of the exemplary innovations, embodiments and/or examples. In the interest of not obscuring the presentation of the exemplary innovations, embodiments and/or examples in the following Detailed Description, some processing steps or operations that are known in the art may be combined together for presentation and for illustration purposes and might not be described in detail. However, a person skilled in the art will recognize that these exemplary innovations, embodiments and/or examples may be used in commerce without these specific details or with equivalents thereof. In other instances, well-known processes and devices are not described in detail as not to unnecessarily obscure aspects of these exemplary innovations, embodiments and/or examples. In other instances, some processing steps or operations that are known in the art may not be described at all. Instead, the following description is focused on the distinctive features or elements of various exemplary innovations, embodiments and/or examples. Furthermore, while this description may refer to some components of the structure in the singular tense, more than one component may be depicted throughout the Figures and like components are labeled with like numerals.

Embodiments of the present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Overview

In light of the long lead times and the ambiguity of the present working model between EDA software suppliers and their fabrication customers, a "User-defined Rule Engine" is described in this technology description. This new technology is designed to let customers define their own customizable design rules without the need to issue any programming enhancement requests. In an example embodiment, the User-defined Rule Engine can help customers with their early stage technology development. With this User-defined Rule Engine, customers can apply their confidential proprietary information on the software without disclosing anything to software suppliers. This new technology can support customers with their in-house development and keep their information safe from disclosure.

Furthermore, new node enhancement turn-around time will be significantly reduced. This new advanced technology is even capable of enabling customizable design rules of arbitrary patterns. Existing working models within the industry still rely on the customer issuing obscure requests, that are incorporated into EDA software and gradually refined, eventually arriving at a solution. Utilizing this technology will revolutionize existing working models of EDA software. Advantageously, EDA tools that incorporate the User-defined Rule Engine will enable synergistic relationships between EDA software suppliers and customers.

For purpose of this disclosure, the User-defined Rule Engine is a module as defined herein. EDA software tools may comprise additional modules that cooperate with the User-defined Rule Engine to achieve a manufacturable SoC circuit design.

Figure 2:
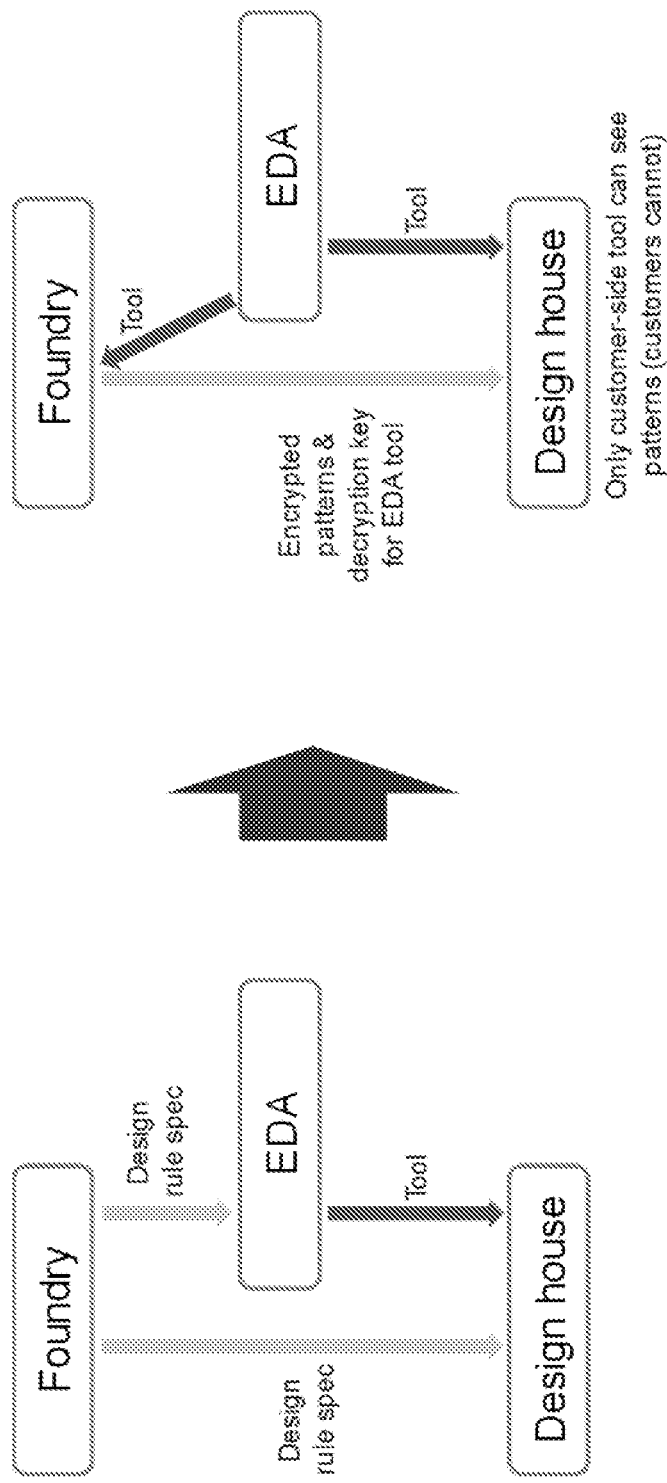
FIG. 2 illustrates a model for foundries to protect their proprietary information (like advanced design rules), while enabling EDA tool suppliers' support for advanced design rules.

Foundry proprietary information of advanced-node designs are commonly referred to within the industry as the foundry's know hows. Normally, foundries release some, or all, of the know hows to EDA companies in order to obtain support in the use of EDA tools. In accordance with one embodiment, a User-defined Rule Engine supports a new advanced rule without knowing the know-hows for a process node. If foundries use the User-Defined Rule Engine, the User-Defined Rule Engine provides for encrypted layout patterns and detailed specifications of advanced-node design rules as an encrypted file, and only the customer-side EDA tool can decrypt the file, as shown in FIG. 2. Customers may encrypt layout patterns and detailed specifications of advanced-node designs rules which then remain accessible solely on the customer side of the EDA tool.

In an example embodiment, customers simply need to prepare a design with the new rule violations, and define the region, or area of design interest, which covers all the shapes related to the violations. The User-defined Rule Engine is then configured to automatically detect the rule pattern in the region and support the new rule. A region, as used herein refers to a rectangular shape with specified layout layers.

The User-defined Rule Engine is configured to support the rule without knowing any detailed information of the foundries know hows. In current technology, when foundries define a new rule, they may do testing and modify the rule several times. Thus, EDA companies spend much time on turn-around discussions and implementation for the rule. The User-defined Rule Engine provides for a temporary solution before the final version is completed. The User-defined Rule Engine reduces coordination time between EDA software developers and the customer design team and enhances each design iteration. Additionally, since the User-defined Rule Engine supports encrypted design rules, there is no need for foundries to publish their new rules. Their rules stay private and confidential regardless if they are in the development stage or completion stage. Further, foundries can do testing by themselves while the rule is still immature. The User-defined Rule Engine protects foundries' confidential information and changes the working model between EDA companies, foundries, and design houses.

Embodiments disclosed herein provide a smart system that: (1) speeds up advanced rule exploration, (2) reduces issue-fixing time for urgent missing violations, and (3) protects foundry and fabless design house proprietary information.

As shown in FIG. 1, foundries have many advanced design rules that should be implemented by EDA software suppliers. More specifically, foundries release detailed specifications of advanced-node design rules, which are not honored by EDA software yet. Therefore, EDA suppliers should understand those design rules and enhance the EDA software to honor those design rules. EDA suppliers spend much time on manual work and communication as foundries always try to protect their manufacturing-process information and release as little information about the design rules as possible. In early development of an advanced-node manufacturing process, the specification is changed while foundries discover defects on test chips. However, the turnaround time is very long so the User-defined Rules Engine is configured to speed up advanced rule exploration.

Fabless design houses have similar needs when EDA tools have missing violations before tape-out at a new process node. They need a system to fix issues in a short time so that design completion target dates are not compromised. Further, as shown in FIG. 2, foundries want to protect their proprietary information (e.g., advanced design rules), but they also need EDA tools' support for their advanced design rules. Currently, foundries release advanced design rules because EDA tools (e.g., placer and router) must understand details to support those rules. As such, foundries may benefit from said smart system including the User-defined Rules Engine to support their advanced design rules without leaking details of their proprietary information.

The User-defined Rules Engine is configured to create a design (layout) that prevents User-defined violating patterns, simultaneously creating and preventing User-defined patterns.

Figure 3:
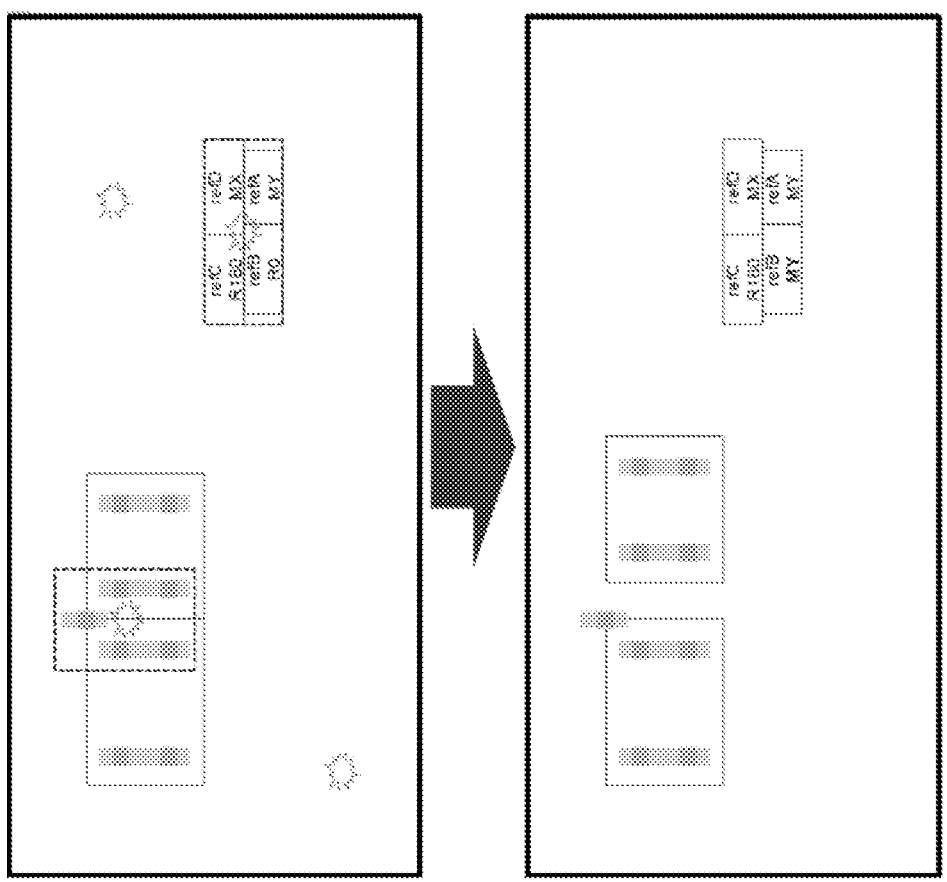
FIG. 3 illustrates input and output to the User-defined Rules Engine to generate a design with no violation for the new process node.
Figure 5B:
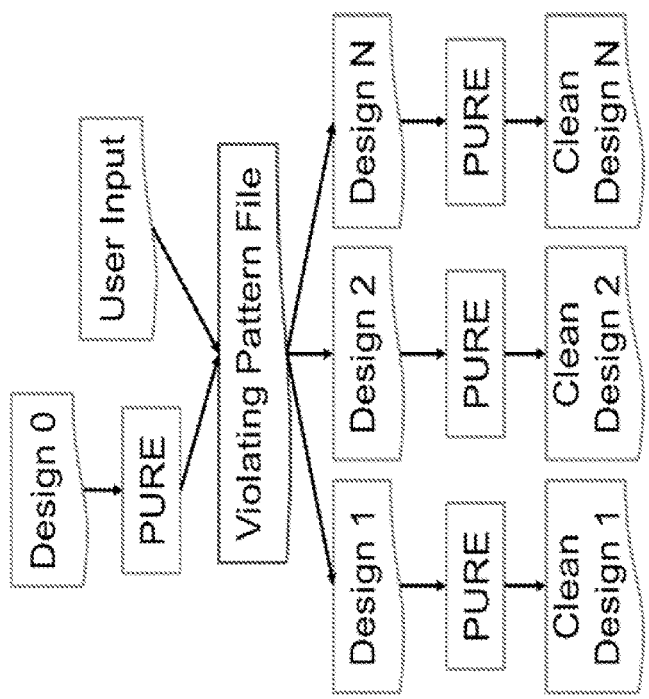
FIG. 5b illustrates a describes a high-level functionality of the User-defined Rules Engine.

Overall, input of the User-defined Rules Engine is a design with violations; output of the User-defined Rules Engine is a design with no violations for the new process node, as shown in FIG. 3. The smart system comprising the User-defined Rules Engine can generate violation-clean designs as shown in FIG. 5b.

Figure 4:
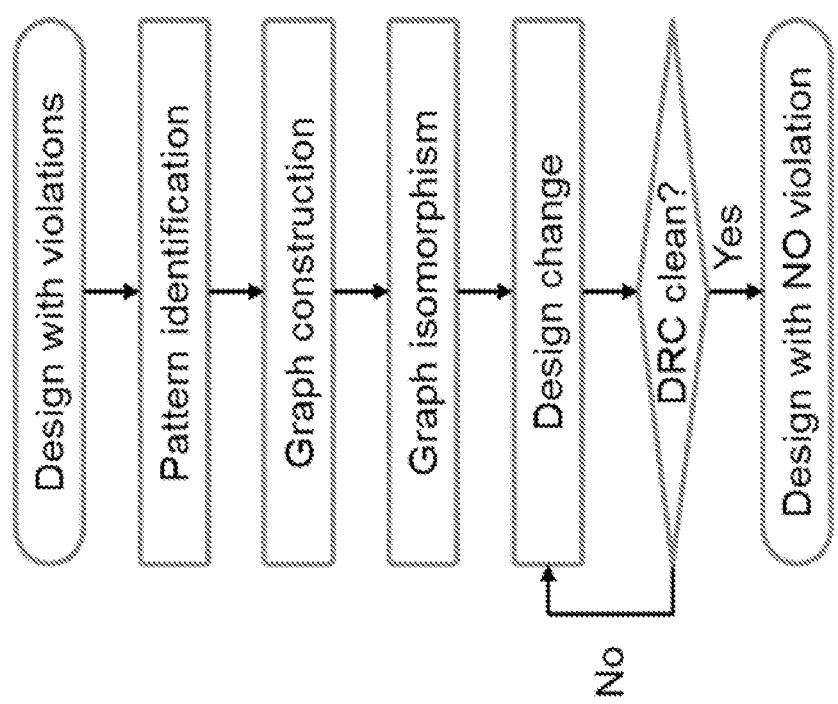
FIG. 4 illustrates a flowchart that describes a high-level functionality of the User-defined Rules Engine.

Initially, the User-defined Rules Engine is configured to identify layout patterns at violating positions and builds pattern graphs for those patterns. Then, the User-defined Rules Engine constructs graphs for designs and finds identical or similar patterns by graph isomorphism in order to compare graphs and subsequently report whether there are identical or similar subgraphs or not. If the User-defined Rules Engine finds identical or similar patterns on designs, the User-defined Rules Engine is configured to change designs to prevent the User-defined Rules Engine from generating violating patterns. These steps as shown in FIG. 4 are executed iteratively until all violations in designs are solved.

I. Pattern Identification

Figure 5A:
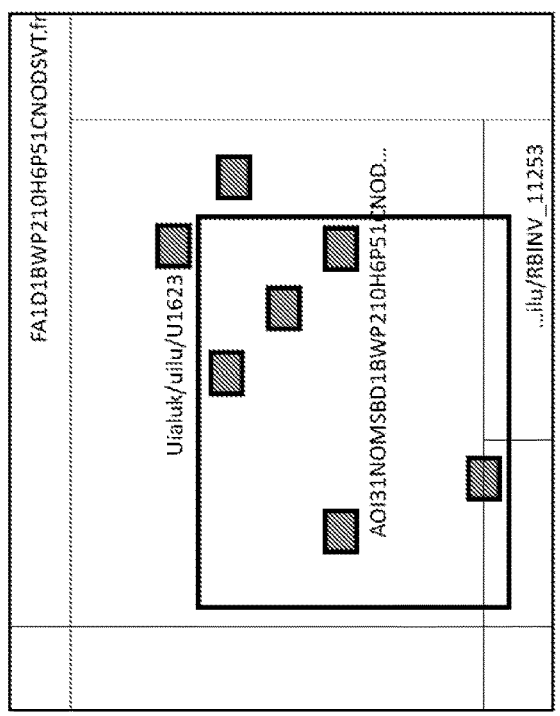
FIG. 5a illustrates a manually selected region on a GUI associated with the User-defined Rules Engine.

In an example embodiment, an initial step is to define the rule pattern. The User-defined Rule Engine needs to know what is a violation and which layers and objects are involved in the new rule. There are several ways to identify the patterns. For example, one embodiment allows this by defining a region in the design and setting related variables. In this way, a user can manually select the region on a graphical user interface (GUI) as shown in FIG. 5a, or just import data from other verification tools. Another embodiment formulates a pattern file. The pattern file can be generated by the User-defined Rule Engine or written by the customer. In yet another example embodiment, a well-prepared file can be applied to other designs.

In the pattern identification stage, the User-defined Rule Engine is configured to write out a pattern file to describe the rule in a fixed format. It can also encrypt this file with a customer's public key, as shown in FIG. 2. Thus, those who have the corresponding private key can use the file and check the rule. This encryption and decryption feature make the new rule confidential.

With User-defined Rule Engine, foundries can be fully supported without releasing confidential process information. Once they design new advanced rules for a new process node, they use the User-defined Rule Engine and create an encrypted file of the new rules. Then the foundries can deliver the encrypted file and decryption key to design houses. By using the User-defined Rule Engine, design houses prepare the file and the key, and the file is decrypted internally without divulging proprietary information. EDA software suppliers, simply provide the EDA tool with User-defined Rule Engine as it automatically supports the new rule. Therefore, in this smart system, foundries retain their know-how of their new advanced design rules for each new process node.

II. Graph Construction

After determining a pattern, the shape of that pattern needs to be transformed into a pattern graph structure. The pattern graph contains all information about the new rule. Nodes of the graph are shapes which are involved in the rule, and edges can describe the spacing or some unique attribute between them. Each rule corresponds to a unique graph.

Figures 6A, 6B:
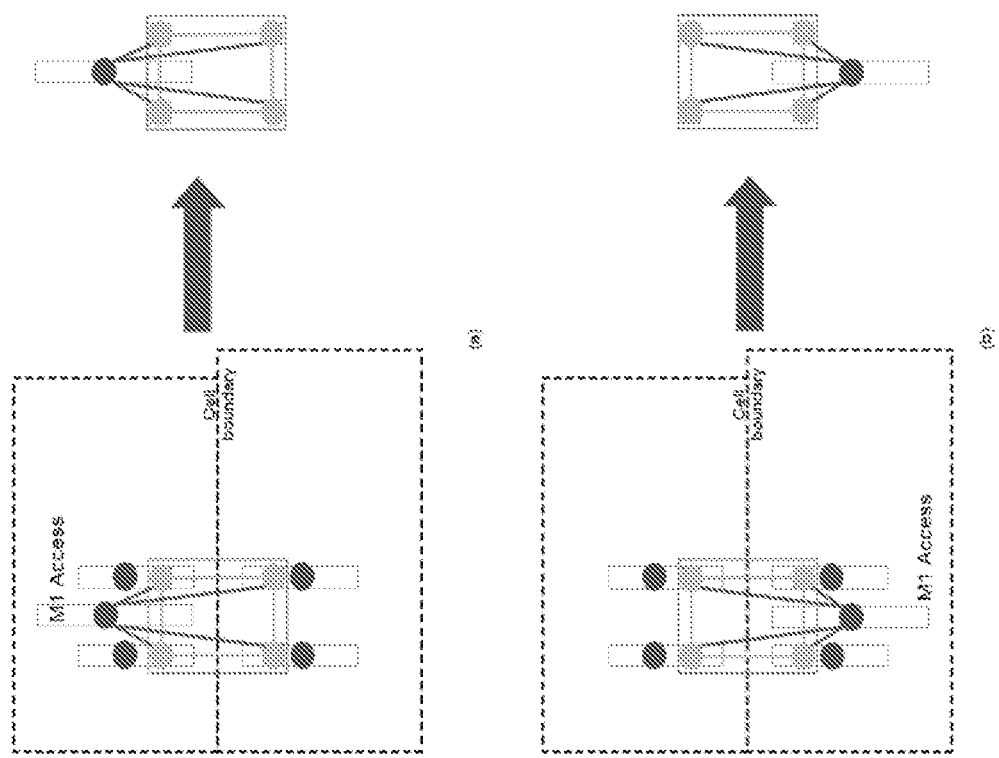
FIGS. 6a and 6b illustrate how the User-defined Rule Engine can support User-defined patterns with different orientations or mirroring.

FIGS. 6a and 6b illustrate how the User-defined Rule Engine can support User-defined patterns with different orientations or mirroring. Therefore, pattern graphs extracted from pattern construction step comes in various forms. As illustrated in FIG. 6(a), the M1 Access metal is above the red keep-out region. Thus, the M1 vertex is above and outside the via rectangle. In FIG. 6(b), the M1 Access comes below the region. The pattern graph extracted is below the via rectangle.

III. Graph Isomorphism

With the extracted pattern graphs, the User-defined Rule Engine is further configured to find each occurrence of this pattern in a SoC design. However, the same pattern can come in many different forms, as illustrated in FIGS. 6a and 6b. To make patterns canonical, a graph-isomorphism function is applied to transform pattern graphs into unambiguous graphs. A graph-isomorphism function is a bijection function f: VG→VH that transforms vertex sets of graph G to another graph H such that any two vertices u and v of G are adjacent in G if and only if f(u) and f(v) are adjacent to H. This transformation is performed via sorting each vertex by its X-coordinates. Vertices with the same X-coordinates are then sorted by their Y-coordinates. Since for any given graph, no two vertices on the same layer would share the same value for coordinates, every vertex has canonical representation ranking its precedence in a pattern graph.

Since the pattern graph is now canonical, the User-defined Rules Engine can find all the occurrences of this pattern graph in the whole design. This solves a subgraph isomorphism problem. A subgraph is a graph whose vertices and edges are subsets of another graph. In formal definition, if given two graphs, H=(VH, EH) and G=(V, E), where V and VH represent the set of vertices of G and H, respectively; E and EH represent the set of edges of G and H, respectively, if H is a subgraph of G, then VH belongs to V, EH belongs to E, and for every edge (vH1, vH2) belonging to EH, vH1 and vH2 belongs to VH; given another two graphs, H=(VH, EH) and G=(V, E), where V and VH represent the set of vertices of G and H, respectively; E and EH represent the set of edge of G and H, respectively, A subgraph isomorphism problem from H to G is to find a function f: VH→V that can transform each edge from EH to E in a 1-1 mapping, such that if an edge (u, v) belongs to EH, then (f(u), f(v)) belongs to E. User-defined Rule Engine first extracts the whole design and transforms it into a graph called a block graph, then the User-defined Rule Engine attempts to find if there is any subgraph that matches the pattern graph by utilizing the previous sorting mechanism. Each pattern matching check is performed by comparing vertices and edges of the pattern graph with those of the block graph in sequential order starting from the bottom-left vertex.

With the advance in technology nodes, design rules of foundries and design houses are usually described in terms of a range, such as less than or greater than. Therefore, in addition to exact subgraph matching mechanism, the User-defined Rule Engine also supports range-based shape matching so that vertices and edges in the pattern graph can be described as a range.

IV. Design Change

After the aforementioned steps, all user-defined patterns in the given design are identified by the User-defined Rule Engine. The engine then works with place and route mechanism to resolve all user-defined patterns. For example, patterns can be resolved by changing cell orientations or moving cells to other locations. This process takes indefinite loops depending on if the changed design still has any design rule or pattern violations. If there are still User-defined patterns or other design rule check violations found in this design, then the iteration continues until all User-define patterns and design rule check violations are cleared.

Figure 7:
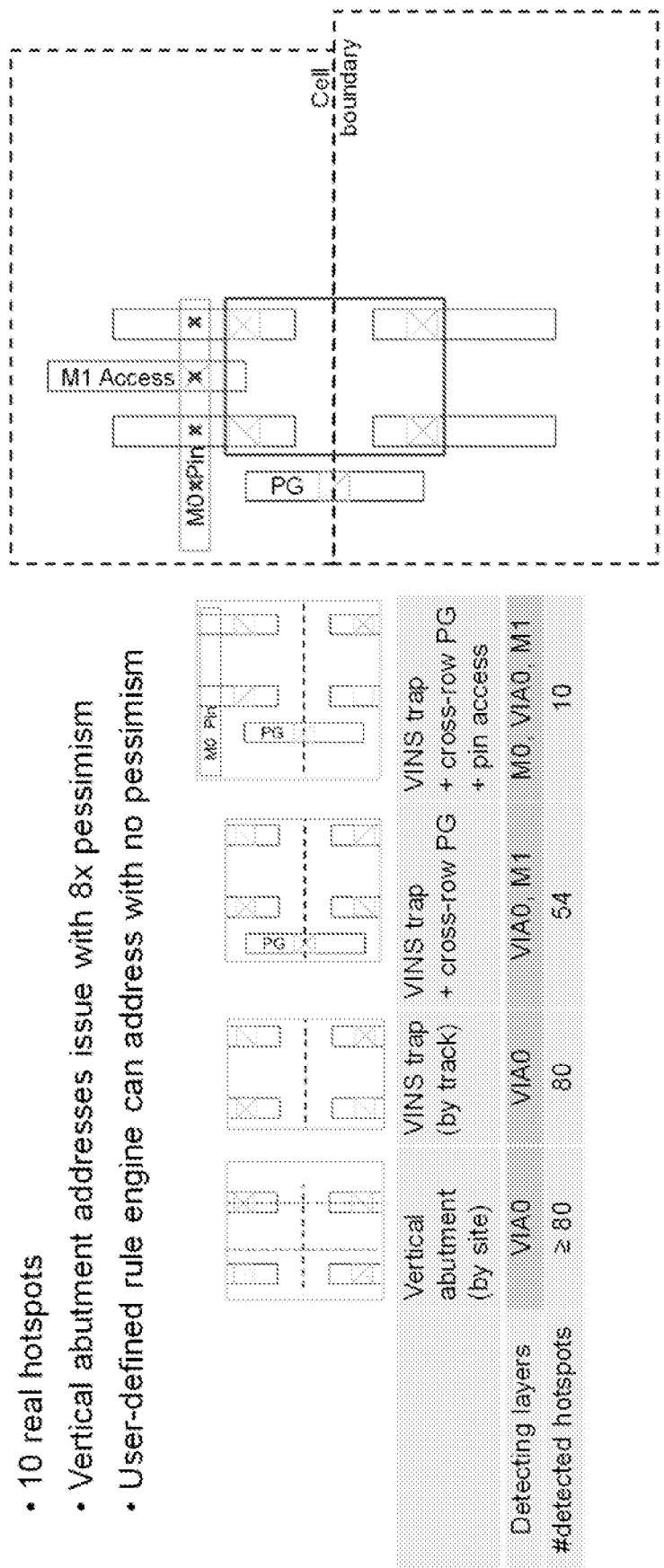
FIG. 7 illustrates the use of the User-defined Rule Engine on a representative system on chip (SoC) design.

FIG. 7 illustrates the use of the User-defined Rule Engine on a representative SoC design. In an example embodiment, FIG. 7 presents comparisons between a traditional method (e.g., vertical abutment by site) and the User-defined Rule Engine. As shown in the right-side layout pattern of FIG. 7, there is a pin-access design rule check violation, which is induced by this kind of layout pattern. In a real SoC design, there are 10 real pin-access design rule check violations; however, a traditional method (e.g., vertical abutment by site) finds more than 80 violations with pessimism since this method cannot utilize all key features in this pattern, like pin-access trap, cross-row PG, and pin-access patterns. In contrast, User-defined Rule Engine can find the exact 10 real pin-access design rule check violations with no pessimism because it utilizes all key features of the pattern.

Figure 8:
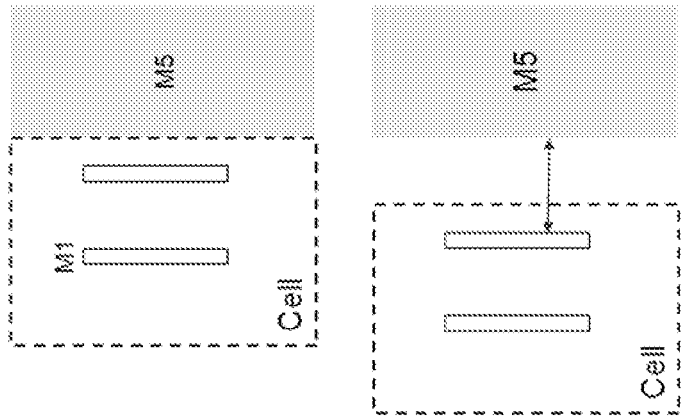
FIG. 8 illustrates the file format of an input pattern format.

FIG. 8 illustrates the file format of an input pattern format. In an example embodiment, FIG. 8 presents an example of an input pattern file. There is a M5 metal shape (in grey) and a cell shape (dash line) in this pattern. In the file, the M5 metal shape is represented by shapeID 0, and the cell shape is represented by shapeID 1. A shape can be extended to represent a set of real shapes, like shapeID 0. A cell shape can be extended to represent a set of cells by wild card, like "*" annotation in shapeID 1.

Embodiments of the present invention allows semiconductor fabricators (i.e. Foundries) and designers to define their own customized design rules using 3rd party Electronic Design Automation (EDA) tools without divulging their trade secrets to the EDA provider. The User-defined Rule Engine helps customers of EDA products with early stage technology development for a new semiconductor processing node.

It will be understood that each block or step of the flowcharts described herein, and combinations of blocks in the flowchart, can be implemented by various means, such as hardware, firmware, and/or software including one or more computer program instructions. For example, one or more of the procedures described above may be embodied by computer program instructions. In this regard, one embodiment of a computer-implemented method for integrated circuit design, testing, and/or manufacturing may include receiving an integrated circuit design, wherein the integrated circuit design comprises at least one position in violation of one or more design rules associated with the integrated design, identifying one or more design patterns at the at least one violating position, generating one or more pattern graphs for the one or more design patterns, extracting a system on chip (SoC) design for transformation into a block graph, and comparing the block graph with each of the one or more pattern graphs to determine whether the at least one violating position is cleared. In circumstances where a match is found between the block graph and the each of the one or more pattern graphs, the computer-implemented method further comprises changing the one or more design patterns and repeating the step of comparing until there is no further match found.

In an example embodiment, the SoC design comprises one or more known non-compliant design elements stored in a design rule database to determine whether a non-compliant design element having the at least one violating position is entered.

In another example embodiment, the computer-implemented method further comprises defining a region in the integrated circuit design and setting related variables via a graphical user interface. The one or more design patterns and detailed specifications of advanced node design rules are encrypted as an encrypted file using a customer specific public key-private key pair.

In an example embodiment, the one or more pattern graphs comprise an advanced node design rule associated with the at least one violating position, wherein nodes of the one or more pattern graphs are representative of shapes associated with the rule and edges are presentative of spacing and/or unique attributes between the shapes.

Additionally, the computer-implemented method further comprises applying a graph-isomorphism function to transform the one or more pattern graphs into one or more unambiguous graphs, wherein applying the graph-isomorphism function to transform the one or more pattern graphs into one or more unambiguous graphs, further comprises transforming vertex sets of graph G to another graph H, wherein two vertices u and v of G are adjacent in G in circumstances when f(u) and f(v) are adjacent to H, wherein f is a bijection function f: VG→VH.

It will be appreciated that certain steps described herein may be performed by several systems, by independent systems, or by a combination of systems. Additionally or alternatively, in some embodiments, the steps alternative operations, alternative operations, and/or a different arrangement of operations may be performed by embodiments within the scope of the disclosure herein. As such, the specific flows illustrated and described are merely exemplary, and are not for purposes of limitation.

Technology Support—General Computer Explanation

Figure 10B:
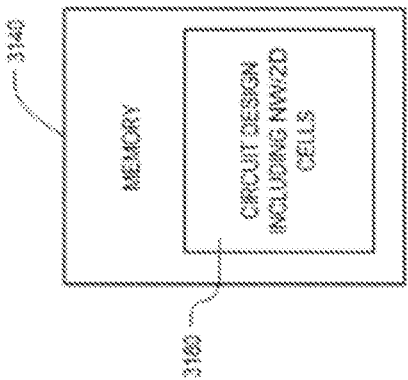
FIGS. 10A, 10B and 10C depict simplified block diagrams of a computer system suitable for use with embodiments of the technology, as well as circuit design and circuit embodiments of the technology.
Figure 10C:
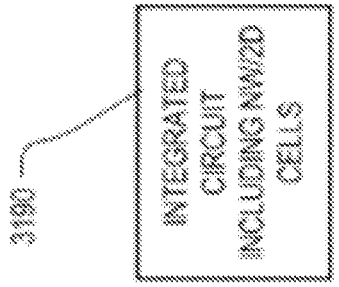
Figure 10A:
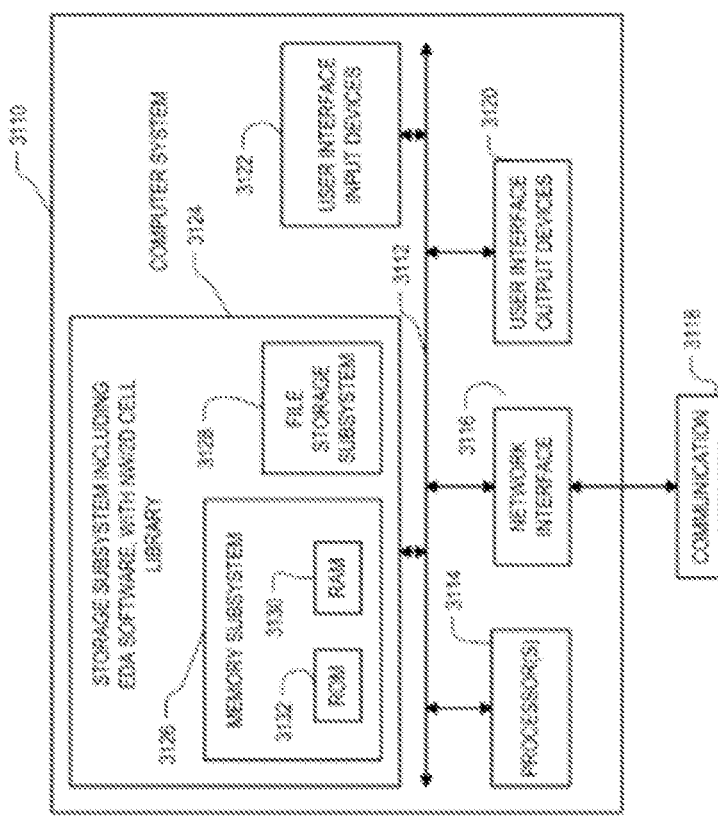

FIGS. 10A, 10B and 10C are simplified block diagrams of a computer system suitable for use with embodiments of the technology, as well as circuit design and circuit embodiments of the technology.

In FIG. 10A, computer system 3110 typically includes at least one computer or processor 3114 which communicates with a number of peripheral devices via bus subsystem 3112. Typically, the computer can include, or the processor can be, any of a microprocessor, graphics processing unit, or digital signal processor, and their electronic processing equivalents, such as an Application Specific Integrated Circuit (ASIC) or Field Programmable Gate Array (FPGA). The terms 'processor' and 'computer' are further defined below. These peripheral devices may include a storage subsystem 3124, comprising a memory subsystem 3126 and a file storage subsystem 3128, customer interface input devices 3122, customer interface output devices 3120, and a network interface subsystem 3116. The input and output devices allow customer interaction with computer system 3110.

The computer system may be a server computer, a client computer, a workstation, a mainframe, a personal computer (PC), a tablet PC, a set-top box (STB), a personal digital assistant (PDA), a cellular telephone, a smartphone, a web appliance, a rack-mounted "blade", a kiosk, a television, a game station, a network router, switch or bridge, or any data processing machine capable of executing instructions 124 (sequential or otherwise) that specify actions to be taken by that machine.

The computer system typically includes an operating system, such as Microsoft's Windows, Sun Microsystems's Solaris, Apple Computer's MacOs, Linux or Unix. The computer system also typically can include a Basic Input/Output System (BIOS) and processor firmware. The operating system, BIOS and firmware are used by the processor to control subsystems and interfaces connected to the processor. Typical processors compatible with these operating systems include the Pentium and Itanium from Intel, the Opteron and Athlon from Advanced Micro Devices, and the ARM processor from ARM Holdings.

Innovations, embodiments and/or examples of the claimed inventions are neither limited to conventional computer applications nor the programmable apparatus that run them. For example, the innovations, embodiments and/or examples of what is claimed can include an optical computer, quantum computer, analog computer, or the like. The computer system may be a multi-processor or multi-core system and may use or be implemented in a distributed or remote system. The term 'processor' here is used in the broadest sense to include a singular processor and multi-core or multi-processor arrays, including graphic processing units, digital signal processors, digital processors and combinations of these devices. Further, while only a single computer system or a single machine may be illustrated, the use of a singular form of such terms shall also signify any collection of computer systems or machines that individually or jointly execute instructions 124 to perform any one or more of the sets of instructions discussed herein. Due to the ever-changing nature of computers and networks, the description of computer system 3110 depicted in FIG. 10A is intended only as one example for purposes of illustrating the preferred embodiments. Many other configurations of computer system 3110 are possible having more or less components than the computer system depicted in FIG. 10A.

Network interface subsystem 3116 provides an interface to outside networks, including an interface to communication network 3118, and is coupled via communication network 3118 to corresponding interface devices in other computer systems or machines. Communication network 3118 may comprise many interconnected computer systems, machines and communication links. These communication links may be wireline links, optical links, wireless links, or any other devices for communication of information. Communication network 3118 can be any suitable computer network, for example a wide area network such as the Internet, and/or a local area network such as Ethernet. The communication network can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

Customer interface input devices 3122 may include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices. Such devices can be connected by wire or wirelessly to a computer system. In general, use of the term "input device" is intended to include all possible types of devices and ways to input information into computer system 3110 or onto communication network 3118. Customer interface input devices typically allow a customer to select objects, icons, text and the like that appear on some types of customer interface output devices, for example, a display subsystem.

Customer interface output devices 3120 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term "output device" is intended to include all possible types of devices and ways to output information from computer system 3110 to the customer or to another machine or computer system.

Memory subsystem 3126 typically includes a number of memories including a main random-access memory (RAM) 3130 (or other volatile storage device) for storage of instructions and data during program execution and a read only memory (ROM) 3132 in which fixed instructions are stored. File storage subsystem 3128 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 3128.

Bus subsystem 3112 provides a device for letting the various components and subsystems of computer system 3110 communicate with each other as intended. Although bus subsystem 3112 is shown schematically as a single bus, alternative embodiments of the bus subsystem may use multiple busses. For example, RAM-based main memory can communicate directly with file storage systems using Direct Memory Access (DMA) systems.

FIG. 10B depicts a memory 3140 such as a non-transitory, computer readable data and information storage medium associated with file storage subsystem 3128, and/or with network interface subsystem 3116, and can include a data structure specifying a circuit design. The memory 3140 can be a hard disk, a floppy disk, a CD-ROM, an optical medium, removable media cartridge, or other medium that stores computer readable data in a volatile or non-volatile form. Software read into a computer from such a memory can be converted at a selected instance in time from a tangible form to a transmission signal that is propagated through a medium (such as a network, connector, wire, or trace as an electrical pulse or a medium such as space or an atmosphere as electromagnetic radiation with wavelengths in the electromagnetic spectrum longer than infrared light).

FIG. 10C signifies an integrated circuit 3190 created with the described technology that includes one or more cells selected, for example, from a cell library.

Technology Support—Hardware/Software Equivalence

Some of the innovations, embodiments and/or examples described herein comprise and/or use a processor. As used herein, the term 'processor' signifies a tangible data and information processing device that physically transforms data and information, typically using a sequence transformations (also referred to as 'operations'). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi-processor arrays, including graphic processing units, digital signal processors, digital processors or combinations of these elements.

The processor can be electronic, for example, comprising digital logic circuitry (for example, binary logic), or analog (for example, an operational amplifier). The processor can also be non-electronic, for example, as seen in processors based on optical signal processing, DNA transformations or quantum mechanics, or a combination of technologies, such as an optoelectronic processor. For data and information structured in binary form, any processor that can transform the data and information using the AND, OR and NOT logical operations (and their derivatives, such as the NAND, NOR, and XOR operations) can transform the data and information using any function of Boolean logic. A processor such as an analog neural network processor can also transform data and information non-digitally. There is no scientific evidence that any of these processors are processing, storing and retrieving data and information, in any manner or form equivalent to the bioelectric structure of the human brain.

The one or more processors may also operate to support performance of the relevant operations in a 'cloud computing' environment or as a 'software as a service' (SaaS). For example, at least some of the operations may be performed by a group of processors available at a distributed or remote system, these processors accessible via a communications network (e.g., the Internet) and via one or more software interfaces (e.g., an application program interface (API).)

As used herein, the term 'module' signifies a tangible data and information processing device, that typically is limited in size and/or complexity. For example, the term 'module' can signify one or more methods or procedures that can transform data and information. The term 'module' can also signify a combination of one or more methods and procedures in a computer program. The term 'module' can also signify a small network of digital logic devices, in which interconnections of the logic devices give structure to the network. Methods and procedures comprising a module, specified in a specialized language, such as System C, can be used to generate a specification for a network of digital logic devices that process data and information with exactly the same results as are obtained from the methods and procedures.

A module can be permanently configured (e.g., hardwired to form hardware), temporarily configured (e.g., programmed with software), or a combination of the two configurations (for example, a structured ASIC). Permanently configured modules can be manufactured, for example, using Application Specific Integrated Circuits (ASICs) such as Arithmetic Logic Units (ALUs), Programmable Logic Arrays (PLAs), or Read Only Memories (ROMs), all of which are typically configured during manufacturing. Temporarily configured modules can be manufactured, for example, using Field Programmable Gate Arrays (FPGAs—for example, sold by Xilink or Intel's Altera), Random Access Memories (RAMs) or microprocessors. A module is configured to process data and information, typically using a sequence transformations (also referred to as 'operations') applied to the data and information (or in the case of ROMs and RAMS, transforming data and information by using the input information as an address for memory that stores output data and information), to perform aspects of the present innovations, embodiments and/or examples of the invention.

Modules that are temporarily configured need not be configured at any one instance in time. For example, a processor comprising one or more modules can have the modules configured at different times. The processor can comprise a set of one or more modules at one instance of time, and to comprise a different set of one or modules at a different instance of time. The decision to manufacture or implement a module in a permanently configured form, a temporarily configured form, or a combination of the two forms, may be driven by cost, time considerations, engineering constraints and/or specific design goals. The "substance" of a module's processing is independent of the form in which it is manufactured or implemented.

As used herein, the term 'algorithm' signifies a process comprising a sequence or set of operations or instructions that a module can use to transform data and information to achieve a result. A module can comprise one or more algorithms. As used herein, the term 'thread' refers to a sequence of instructions that can comprise a subset of the instructions of an entire process or algorithm. A process or algorithm can be partitioned into multiple threads that can be executed in parallel.

As used herein, the term 'computer' includes at least one information processor that, for example, can perform certain operations such as (but not limited to) the AND, OR and NOT logical operations using electronic gates that can comprise transistors, with the addition of memory (for example, memory based on flip-flops using the NOT-AND or NOT-OR operation). Such a processor is said to be Turing-complete or computationally universal. A computer, whether or not it is a digital computer, typically comprises many modules.

As used herein, the term 'software' or 'program' signifies one or more algorithms and data structures that configure a processor for use in the innovations, embodiments and examples described in this specification. Such devices configurable by software include one or more computers, for example, standalone, client or server computers, or one or more hardware modules, or systems of one or more such computers or modules. As used herein, the term "software application" signifies a set of data and instructions that configure the processor to achieve a specific result, for example, to perform word processing operations, or to encrypt a set of data.

As used herein, the term 'programming language' signifies a grammar and syntax for specifying sets of instruction and data that comprise software. Programming languages include assembler instructions, instruction-set-architecture (ISA) instructions, machine instructions, machine dependent instructions, microcode, firmware instructions, state-setting data, or either source code or object code written in any combination of one or more higher level languages, such as conventional procedural programming languages, for example, the "C" programming language or similar programming languages (such as SystemC), or object oriented programming language such as Smalltalk, C++ or the like, and any future equivalent programming languages.

Software is entered into, equivalently, read into, one or memories of the computer or computer system from a data and information storage device. The computer typically has a device for reading storage media that is used to transport the software, or has an interface device that receives the software over a network. This process is discussed in the General Computer Explanation section.

Technology Support—EDA System/Workflow Explanation

Figure 9:
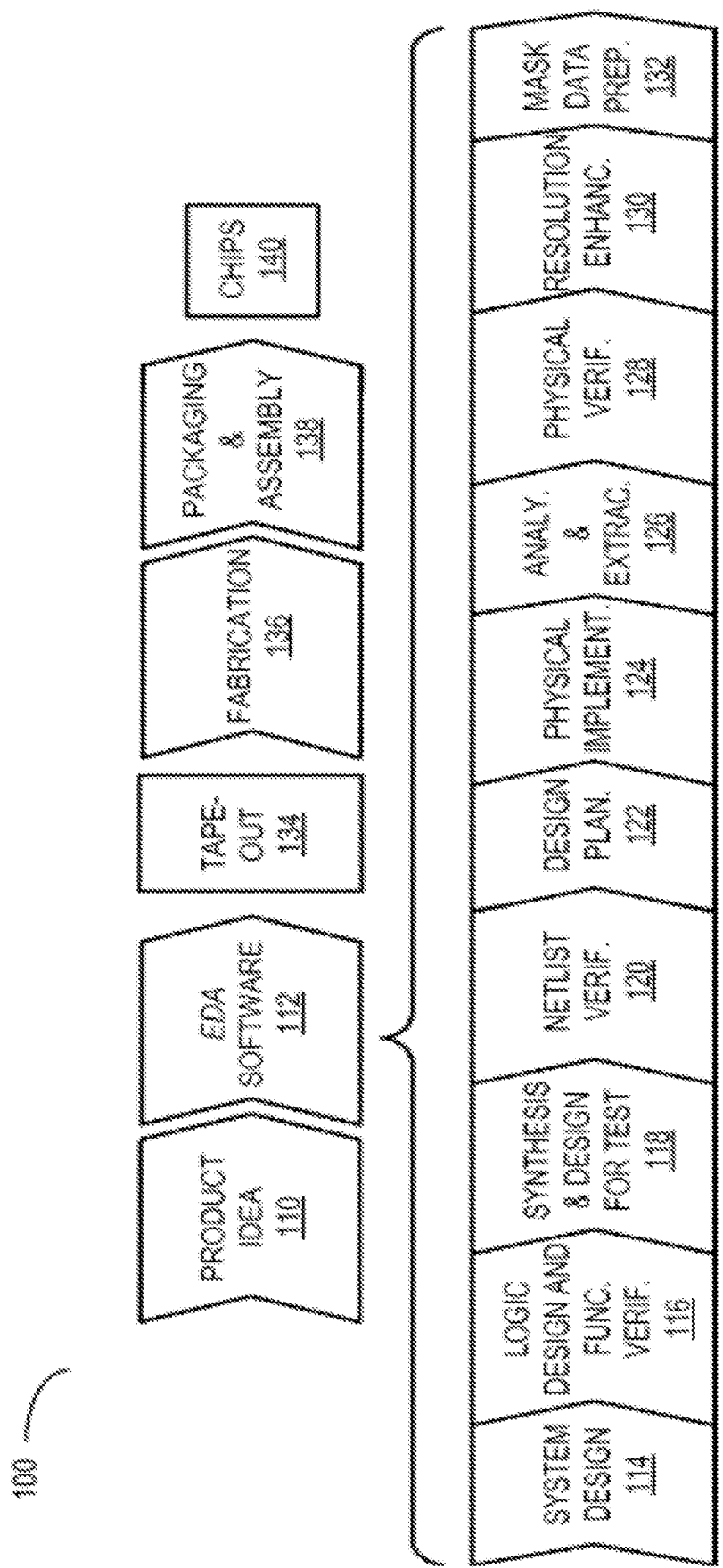
FIG. 9 depicts a flowchart of various operations in the design and fabrication of an integrated circuit in accordance with an embodiment of the present disclosure.

FIG. 9 illustrates various processes performed in the design, verification and fabrication of an item of manufacture such as an integrated circuit using software tools with a computer, and possibly special hardware-assisted tools, to transform and verify design data and instructions that represent the integrated circuit. These processes start with the generation of a product idea 110 with information supplied by a designer, information which is transformed during a process to create an item of manufacture (referred to herein as a design or device) that uses an EDA software tool 112, which may also be signified herein as EDA software, as a design tool, or a verification tool. When the design is finalized, it can be taped-out 134, which typically is when artwork (e.g., geometric patterns) for the integrated circuit is sent to a fabrication facility to manufacture the mask set, which is then used to manufacture the integrated circuit. After tape-out, a semiconductor die is fabricated 136 and packaging and assembly processes 138 are performed, which result in the finished integrated circuit 140 which may also be signified herein as a circuit, device, component, chip or SoC (System on Chip).

Items of manufacture, for example, a circuit or system are used in commerce at a variety of levels of abstraction ranging from low-level transistor layouts to high-level description languages. Most designers start at high-level of abstraction to design their circuits and systems, using a hardware description language (HDL) such as VHDL, Verilog, SystemVerilog, SystemC, MyHDL or OpenVera. The high-level HDL is easier for developers to comprehend, especially for a vast system, and may describe highly complex concepts that are difficult to grasp using a lower level of abstraction. The HDL description may be converted into other levels of abstraction as is helpful to the developers. For example, a high-level description may be converted to a logic-level register transfer level (RTL) description, a gate-level (GL) description, a layout-level description, or a mask-level description. Each lower abstraction level introduces more detail into the design description. The lower-levels of abstraction may be generated automatically by computer, derived from a design library, or created by another design automation technique. An example of a specification language at a lower level of abstraction is SPICE, much used detailed descriptions of analog-based circuits.

A design process that uses an EDA software tool 112 includes processes 114-132, which are described below. This design flow description is for illustration purposes only and is not meant to limit the present disclosure. For example, an actual integrated circuit design may require a designer to perform the design operations in a different sequence than the sequence described herein.

During system design 114, a designer describes the functionality to be manufactured. The designer can also perform what-if planning to refine the functionality and to check costs, etc. Hardware-software architecture partitioning can occur at this stage. Exemplary EDA software products from Synopsys, Inc. of Mountain View, Calif., that can be used at this stage include: Model Architect, Saber, System Studio, and Designware products.

During logic design and functional verification 116, modules in the circuit are specified in one or more hardware description languages, or HDLs, and the design in HDL is checked for functional accuracy, that is, to match the requirements of the specification of the circuit or system being designed to ensure that the design produces the correct outputs. Exemplary HDL languages are Verilog, VHDL and SystemC. Functional verification is typically done by using software-based simulators and other tools such as testbench generators, static HDL checking tools and formal verification tools. In some situations, special hardware referred to as 'emulators' or 'prototyping systems' are used to speed up the functional verification. Exemplary EDA software products from Synopsys, Inc. of Mountain View, Calif. that can be used at this stage include: VCS, Vera, Designware, Magellan, Formality, ESP and Leda products. Exemplary emulator and prototyping products also available from Synopsys that can be used at this state include: Zebu® and Protolink® (®="Registered Trademark").

During synthesis and design for test 118, HDL code is translated to a netlist. This netlist can be optimized for the target technology. Additionally, tests can be designed and implemented to check the finished integrated circuit. Exemplary EDA software products from Synopsys, Inc. of Mountain View, Calif. that can be used at this stage include: Design Compiler, Physical Compiler, Test Compiler, Power Compiler, FPGA Compiler, Tetramax, and Designware products.

During netlist verification 120, the netlist is checked for compliance with timing constraints and for correspondence with the HDL code. Exemplary EDA software products from Synopsys, Inc. of Mountain View, Calif. that can be used at this stage include: Formality, Primetime, and VCS products.

During design planning 122, an overall floor plan for the integrated circuit is constructed and analyzed for timing and top-level routing. Exemplary EDA software products from Synopsys, Inc. of Mountain View, Calif. that can be used at this stage include: Astro and IC Compiler products.

During layout implementation 124, the physical placement (positioning of circuit elements such as transistors or capacitors) and routing (connection of the same by a plurality of conductors) occurs, as can selection of library cells to perform specific logic functions. Exemplary EDA software products from Synopsys, Inc. of Mountain View, Calif. that can be used at this stage include: the Astro and IC Compiler products.

During analysis and extraction 126, the circuit function is verified at the layout level, which permits refinement of the layout design. Exemplary EDA software products from Synopsys, Inc. of Mountain View, Calif. that can be used at this stage include: Astrorail, Primerail, Primetime, and Star RC/XT products.

During physical verification 128, the layout design is checked to ensure correctness for manufacturing constraints such as DRC constraints, electrical constraints, lithographic constraints, and circuitry function matching the HDL design specification. Exemplary EDA software products from Synopsys, Inc. of Mountain View, Calif. that can be used at this stage include the Hercules product.

During resolution enhancement 130, geometric manipulations of the layout are performed to improve manufacturability of the design. Exemplary EDA software products from Synopsys, Inc. of Mountain View, Calif. that can be used at this stage include: Proteus products.

During tape-out, data is created to be used (after lithographic enhancements are applied if appropriate) for production of lithography masks. Example EDA software products from Synopsys, Inc., that can be used during tape-out include the IC Compiler and Custom Designer families of products.

During mask-data preparation 132, the 'tape-out' data is used to produce lithography masks that are used to produce finished integrated circuits. Exemplary EDA software products from Synopsys, Inc. of Mountain View, Calif. that can be used at this stage include the CATS family of products.

For all of the above mentioned integrated circuit design tools, similar tools from other EDA suppliers, such as Cadence, Siemens, other corporate entities or various non-commercial tools from universities, or open source repositories, can be used as an alternative.

Embodiments of the present disclosure can be used during one or more of the above-described stages. Specifically, some embodiments of the present disclosure can be used in EDA software 112.

A storage subsystem is preferably used to store the programs and data structures that provide the functionality of some or all of the EDA tools described herein, and tools applied for development of cells for the library and for physical and logical design using the library. These programs and data structures are generally executed by one or more processors in a manner known to those of ordinary skill in the art.

Technology Support—Emulation Environment Explanation

Figure 11:
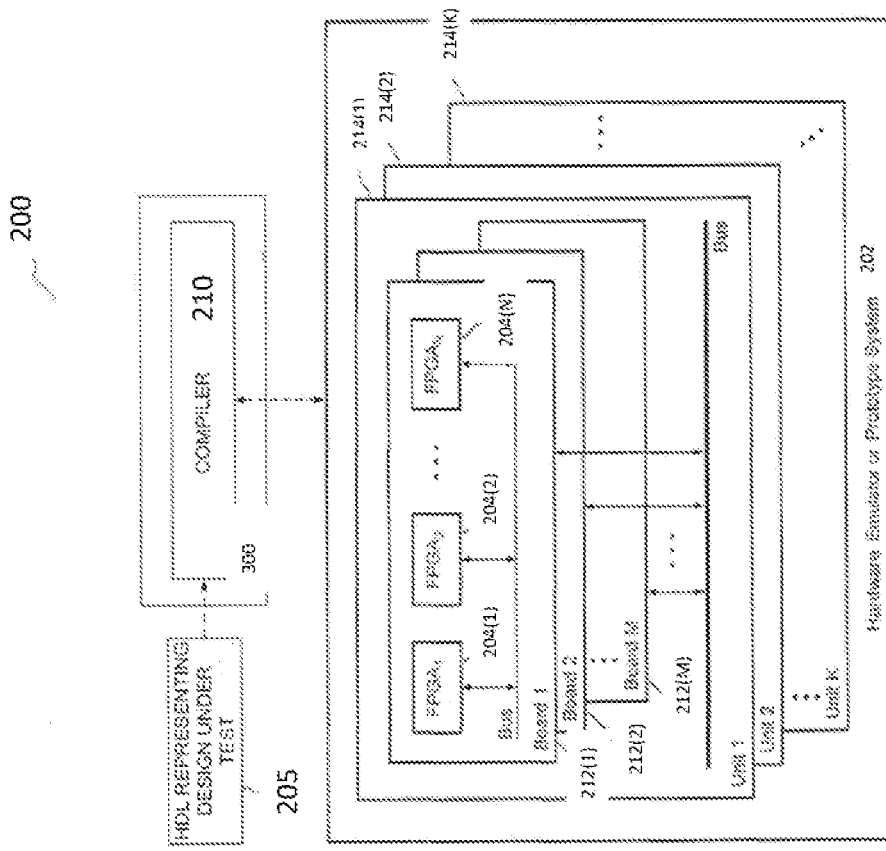
FIG. 11 depicts a block diagram of an emulation system.

An EDA software system, such as element 112 depicted in FIG. 1, typically includes an emulation system 116 to verify the functionality of the circuit design. FIG. 11 depicts a typical emulation system which includes a host computer system 300 (often part of an EDA system) and an emulator system 202 (typically a set of programmable devices such as Field Programmable Gate Arrays (FPGAs)). The host system generates data and information, typically using a compiler 210, to configure the emulator to emulate a circuit design. One of more circuit designs to be emulated are referred to as a DUT (Design Under Test). The emulator is a hardware system that emulates a DUT, for example, to use the emulation results for verifying the functionality of the DUT. One example of an emulation system that can be used for the embodiments disclosed herein is the ZeBus Server available from Synopsys, Inc.

The host system 300 comprises one or more processors. In the embodiment where the host system is comprised of multiple processors, the functions described herein as being performed by the host system may be distributed among the multiple processors.

The host system 300 typically includes a compiler 210 that processes code written in a hardware description language that represents a DUT, producing data (typically binary) and information that is used to configure the emulation system 202 to emulate the DUT. The compiler 210 may transform, change, reconfigure, add new functions to, and/or control the timing of the DUT.

The host system and emulator exchange data and information using signals carried by an emulation connection. The connection can be one or more electrical cables, for example, cables with pin configurations compatible with the RS232 or USB protocols. The connection can be a wired communication medium or network, such as a local area network, or a wide area network such as the Internet. The connection can be a wireless communication medium or a network with one or more points of access, using a wireless protocol such as Bluetooth® or IEEE 802.11. The host system and emulator can exchange data and information through a third device, such as a network server.

The emulator includes multiple FPGAs (or other programmable devices), for example, elements 2041 to 204N in FIG. 2. Each FPGA can include one or more FPGA interfaces through which the FPGA is connected to other FPGAs of the emulator (and potentially other emulator hardware components), in order for the FPGAs to exchange signals. An FPGA interface may also be referred to as an input/output pin or an FPGA pad. While some embodiments disclosed herein make use of emulators comprising FPGAs, other embodiments can include other types of logic blocks instead of, or along with, the FPGAs for emulating DUTs, for example, custom FPGAs, specialized ASICs for emulation or prototyping, memories, and input/output devices.

A programmable device may include an array of programmable logic blocks and a hierarchy of reconfigurable interconnects that allow the programmable logic blocks to be connected to each other according to the descriptions in the HDL code. Each of the programmable logic blocks can be configured to perform complex combinational functions, or merely simple logic gates, such as AND, and XOR logic blocks.

In many FPGAs, logic blocks also include memory elements, which may be simple latches, flip-flops or more complex blocks of memory. Depending on the length of the interconnections between different logic blocks, signals may arrive at input terminals of the logic blocks at different times.

Programmable processors 2041-204N may be placed into one or more hardware boards 2121 through 212M. Many of such boards may be placed into a hardware unit, e.g. 2141. The boards within a unit may be connected using the backplane of the unit or any other types of connections. In addition, multiple hardware units (e.g., 2141 through 214K) may be connected to each other by cables or any other means to form a multi-unit system. In general, the hardware emulation or prototype system 202 may be formed using a single board, a single unit with multiple boards, or with multiple units without departing from the teachings of the present disclosure.

For a DUT that is to be emulated, the emulator receives from the host system one or more bit files including a description of the DUT. The bit files further specify partitions of the DUT created by the host system with trace and injection logic, mappings of the partitions to the FPGAs of the emulator, and design constraints. Based on the bit files, the emulator configures the FPGAs to perform the functions of the DUT. With some emulators, one or more FPGAs of an emulator already have the trace and injection logic built into the silicon of the FPGA. For this type of emulator, the FPGAs don't have to be configured by the host system to emulate trace and injection logic.

The host system 110 receives (e.g., from a customer) a description of a DUT that is to be emulated. In one embodiment, the DUT description is in a hardware description language (HDL), such as register transfer language (RTL). In another embodiment, the DUT description is in netlist level files, or a mix of netlist level files and HDL files. If part of the DUT description or the entire DUT description is in a HDL, the host system synthesizes the DUT description to create a gate level netlist based on the DUT description. A host system can use the netlist of the DUT to partition the DUT into multiple partitions, with some of these partitions including trace and injection logic. The trace and injection logic traces interface signals exchanged via the interfaces of an FPGA. Additionally, the trace and injection logic can be used to inject traced interface signals into the logic of the FPGA. The host system maps each partition to an FPGA of the emulator. With some emulators, the trace and injection logic is only included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic was incorporated, the bit files also describe the incorporation of the logic. The bit files may also include place and route information and design constraints. The host system stores the bit files and also stores for components of the DUT information describing which FPGAs are to emulate each component of the DUT (to which FPGAs each component is mapped).

Upon request, the host system transmits the bit files to the emulator. The host system instructs the emulator to emulate the DUT. During emulation of the DUT or at the end of the emulation, the host system receives emulation results from the emulator through the emulation connection. Emulation results are data and information generated by the emulator based on the emulation of the DUT. The emulation results include interface signals (states of interface signals) traced by the trace and injection logic of each FPGA. The host system can stores the emulation results, or transmit them to another processing system.

After emulation of the DUT, a customer may request to debug a component of the DUT. If such a request is made the customer may provide a time period of the emulation to debug. The host system identifies which FPGAs are configured to emulate the component based on the stored information. The host system retrieves stored interface signals associated with the time period and traced by the trace and injection logic of each identified FPGA. The host system instructs the emulator to re-emulate the identified FPGAs, either one by one, multiple at a time, or altogether. The host system transmits the retrieved interface signals to the emulator in order to re-emulate the component for the time period. The trace and injection logic of each identified FPGA injects its respective interface signals received from the host system into the logic of the DUT mapped to the FPGA. In case of multiple re-emulations of an FPGA, the results may be merged all together to have a full debug view.

The host system receives from the emulator signals traced by logic of the identified FPGAs during the re-emulation of the component. The host system stores the signals received from the emulator. The signals traced during the re-emulation can have a higher sampling rate than during the initial emulation. For example, in the initial run a traced signal may be comprised of a saved hardware state every X milliseconds. However, in the re-emulation the traced signal may be comprised of a saved hardware state every Y milliseconds, where Y is less than X. If the customer requests to view a waveform of a signal traced during the re-emulation, the host system can retrieve the stored signal and display a plot of the signal (generates a waveform of the signal). Afterwards the customer can, for example, request to re-emulate the same component but for a different time period or to re-emulate another component.

A host system typically comprises at least seven subsystems: a design synthesizer, a mapping module, a run time module, a results module, a debug module, a waveform module, and a storage module. Each of these sub-systems may be embodied as hardware, software, firmware, or a combination thereof. Together these components configure the emulator, and monitor the emulation results.

The design synthesizer converts the HDL of a DUT into gate level logic. For a DUT that is to be emulated, the design synthesizer receives a description of the DUT. If the description of the DUT is fully or partially in HDL (e.g., RTL or other level of abstraction), the design synthesizer 210 synthesizes the HDL of the DUT to create a gate-level netlist with a description of the DUT in terms of gate level logic.

The mapping module partitions DUTs and maps partitions to emulator FPGAs. The mapping module partitions a DUT at the gate level into a number of partitions using the netlist of the DUT. For each partition, the mapping module retrieves a gate level description of the trace and injection logic and incorporates the logic into the partition. As described above, the trace and injection logic included in a partition is configured to trace signals exchanged via the interfaces of an FPGA to which the partition is mapped (trace interface signals). The trace and injection logic can be incorporated into the DUT prior to the partitioning. For example, the trace and injection logic may be incorporated by the design synthesizer prior to or after the synthesizing the HDL of the DUT. Hence, the trace and injection logic may not match the partitions, it may be a subset, a superset or even different from the partitions.

In addition to including the trace and injection logic, the mapping module may include additional tracing logic in a partition in order to trace the states of certain DUT components that are not traced by the trace and injection logic (to trace signals other than the interface signals traced by the trace and injection logic). The mapping module may include the additional tracing logic in the DUT prior to the partitioning or in partitions after the partitioning. The design synthesizer can include the additional tracing logic in an HDL description of the DUT prior to synthesizing the description.

The mapping module maps each partition of the DUT to an FPGA of the emulator. The mapping module performs the partitioning and mapping using design rules, design constraints (e.g., timing or logic constraints), and information about the emulator. For components of the DUT, the mapping module stores information in the storage module describing which FPGAs are to emulate each component.

Based on the partitioning and the mapping, the mapping module generates one or more bit files that describe the created partitions and the mapping of logic to each FPGA of the emulator. The bit files may include additional information, such as constraints of the DUT, and routing information of connections between FPGAs and connections within each FPGA. The mapping module can generate a bit file for each partition of the DUT, which can be stored in the storage module. Upon request from a customer, the mapping module transmits the bit files to the emulator, which the emulator uses to configure the FPGAs to emulate the DUT.

If the emulator includes specialized ASICs that include the trace and injection logic, the mapping module may generate a specific configuration allowing to connect them to the DUT or just save the information of what traced/injected signal is and where the information is stored on the specialized ASIC.

The run time module controls emulations performed on the emulator. The run time module may cause the emulator to start or stop executing an emulation. Additionally, the run time module may provide input signals/data to the emulator. The input signals may be provided directly to the emulator through the connection or indirectly through other input signal devices. For example, the host system with the run time module may control an input signal device to provide the input signals to the emulator. The input signal device may be, for example, a test board (directly or through cables), signal generator, another emulator, or another host system.

The results module processes emulation results generated by the emulator. During emulation and/or after completing the emulation, the results module receives emulation results from the emulator generated during the emulation. The emulation results include signals traced during the emulation. Specifically, the emulation results include interface signals traced by the trace and injection logic emulated by each FPGA. The emulation results may also include signals traced by additional logic included in the DUT. Each traced signal can span multiple cycles of the emulation. A traced signal is comprised of multiple hardware states and each hardware state is associated with a time of the emulation. The results module stores the traced signals received in the storage module. For each stored signal, the results module can store information indicating which FPGA generated the traced signal.

The debug module allows customers to debug DUT components. After the emulator has emulated a DUT and the results module has received the interface signals traced by the trace and injection logic during the emulation, a customer may request to debug a component of the DUT by re-emulating the component for a specific time period. In a request to debug a component, the customer identifies the component and indicates a time period of the emulation to debug. The customer's request can also include a sampling rate that indicates how often hardware states should be saved by logic that traces signals.

The debug module identifies the one or more FPGAs of the emulator that are configured to emulate the component based on the information stored by the mapping module in the storage module. For each identified FPGA, the debug module retrieves, from the storage module, interface signals traced by the trace and injection logic of the FPGA during the time period indicated by the customer (i.e., retrieve hardware states traced by the trace and injection logic that are associated with the time period).

The debug module transmits the retrieved interface signals to the emulator. The debug module instructs the debug module to run the identified FPGAs and for the trace and injection logic of each identified FPGA to inject its respective traced signals into logic of the FPGA in order to re-emulate the component for the requested time period. The debug module can also transmit the sampling rate provided by the customer to the emulator so that the tracing logic traces hardware states at the proper intervals.

To debug the component, the emulator only has to run the FPGAs to which the component has been mapped. Additionally, the re-emulation of the component does not have to start from the beginning, but can start at any point desired by the customer.

For an identified FPGA, the debug module can transmit instructions to the emulator to load multiple emulator FPGAs with the same configuration of the identified FPGA. The debug module additionally instructs the emulator to run the multiple FPGAs in parallel. Each FPGA from the multiple FPGAs is run with a different time window of the interface signals in order to generate a larger time window in a shorter amount of time. For example, for the identified FPGA to run a certain amount of cycles it may take an hour. However, if multiple FPGAs are loaded with the configuration of the identified FPGA and each of the FPGAs runs a subset of the cycles, it may only take a few minutes for the FPGAs to collectively run all of the cycles.

A customer may identify a hierarchy or a list of DUT signals to re-emulate. To enable this, the debug module determines the FPGA needed to emulate the hierarchy or list of signals, retrieves the necessary interface signals and transmits the retrieved interface signals to the emulator for re-emulation. Hence, a customer can identify any element (e.g., component or signal) of the DUT to debug/reemulate. The waveform module generates waveforms based on traced signals. If a customer requests to view a waveform of a signal traced during an emulation run, the host system retrieves the signal from the storage module. The waveform module displays a plot of the signal to the customer. For one or more signals, when the signals are received from the emulator, the waveform module can automatically generate the plots of the signals.

Semantic Support

The signifier 'commercial solution' signifies, solely for the following paragraph, an engineering domain-specific (and thus non-preemptive—see Bilski) electronic structure, process for specified machines, manufacturable circuit (and their Church-Turing equivalents) or composition of matter that is useful in commerce to solve a problem of technology, that is, a use in commerce of an application of science or use in commerce of technology.

The signifier 'abstract' (when used in a patent claim for any embodiments disclosed herein for a new commercial solution that is a scientific application of one or more laws of nature {see Benson}, and that solves a problem of technology {see Diehr} used in commerce—or improves upon an existing commercial solution {see Diehr})—is precisely defined by the inventor(s) {see MPEP 2111.01} as follows:

a) a new commercial solution is 'abstract' if it is not novel (e.g., it is so well known in equal prior art {see Alice} and/or the use of equivalent prior art solutions is long prevalent {see Bilski} in science, engineering or commerce), and thus unpatentable under 35 U.S.C. 102, for example, because it is "difficult to understand" {see Merriam-Webster definition for 'abstract'} how the commercial solution differs from equivalent prior art solutions; or b) a new commercial solution is 'abstract' if it is obvious, that is, if the existing prior art includes at least one analogous prior art solution {see KSR}, or the existing prior art includes at least two prior art items that can be combined {see Alice} by a person having ordinary skill in the art {a "PHOSITA", see MPEP 2141-2144} to be equivalent to the new commercial solution, and is thus unpatentable under 35 U.S.C. 103, for example, because it is "difficult to understand" how the new commercial solution differs from a PHOSITA-combination/-application of the existing prior art; or c) a new commercial solution is 'abstract' if it is not disclosed with an enabling description either because there is insufficient guidance in the enabling description, or because only a generic implementation is described {see Mayo} with unspecified elements, parameters or functionality, so that a PHOSITA is unable to instantiate a useful embodiment of the new commercial solution, without, for example, requiring special programming {see Katz} or circuit design to be performed by the PHOSITA), and is thus unpatentable under 35 U.S.C. 112, for example, because it is "difficult to understand" how to use in commerce any embodiment of the new commercial solution.

CONCLUSION

The foregoing Detailed Description signifies in isolation the individual features, structures, functions, or characteristics described herein and any combination of two or more such features, structures, functions or characteristics, to the extent that such features, structures, functions or characteristics or combinations thereof are based on the present specification as a whole in light of the knowledge of a person skilled in the art, irrespective of whether such features, structures, functions or characteristics, or combinations thereof, solve any problems disclosed herein, and without limitation to the scope of the claims. When an embodiment of a claimed invention comprises a particular feature, structure, function or characteristic, it is within the knowledge of a person skilled in the art to use such feature, structure, function, or characteristic in connection with other embodiments whether or not explicitly described, for example, as a substitute for another feature, structure, function or characteristic.

In view of the foregoing Detailed Description it will be evident to a person skilled in the art that many variations may be made within the scope of innovations, embodiments and/or examples, such as function and arrangement of elements, described herein without departing from the principles described herein. One or more elements of an embodiment may be substituted for one or more elements in another embodiment, as will be apparent to those skilled in the art. The embodiments described herein are chosto signify the principles of the invention and its useful application, thereby enabling others skilled in the art to understand how various embodiments and variations are suited to the particular uses signified.

The foregoing Detailed Description of innovations, embodiments, and/or examples of the claimed inventions has been provided for the purposes of illustration and description. It is not intended to be exhaustive nor to limit the claimed inventions to the precise forms described, but is to be accorded the widest scope consistent with the principles and features disclosed herein. Obviously, many variations will be recognized by a person skilled in this art. Without limitation, any and all equivalents described, signified or incorporated by reference in this patent application are specifically incorporated by reference into the description herein of the innovations, embodiments and/or examples. In addition, any and all variations described, signified or incorporated by reference herein with respect to any one embodiment are also to be considered taught with respect to all other embodiments. Any such variations include both currently known variations as well as future variations, for example any element used herein includes a future equivalent element that provides the same function, regardless of the structure of the future equivalent.

It is intended that the scope of the claimed inventions be defined and judged by the following claims and equivalents. The following claims are hereby incorporated into the Detailed Description, with each claim standing on its own as a separate embodiment. Disclosed embodiments can be described with more features than are expressly recited in the claims.

What is claimed is:

1. A system comprising:
a memory storing instructions; and
a processor coupled with the memory and configured to execute the instructions, the instructions when executed cause the processor to:
receive an integrated circuit design, wherein the integrated circuit design comprises at least one position in violation of a design rule associated with the integrated circuit design;
identify one or more design patterns at the at least one violating position;
generate one or more pattern graphs for the one or more design patterns, wherein the one or more pattern graphs comprises a node representative of a first shape associated with the design rule;
extract a system on chip (SoC) design for transformation into a block graph;
compare the block graph with each of the one or more pattern graphs to determine whether the at least one violating position is cleared;
in circumstances where a match is found between the block graph and the each of the one or more pattern graphs, change the one or more design patterns; and
repeat the step of comparing until there is no further match found.

2. The system of claim 1, wherein the SoC design comprises one or more known non-compliant design elements stored in a design rule database to determine whether a non-compliant design element having the at least one violating position is entered.

3. The system of claim 1 further configured to:
define a region in the integrated circuit design and setting related variables via a graphical user interface.

4. The system of claim 1, wherein the one or more design patterns and detailed specifications of advanced node design rules are encrypted as an encrypted file using a customer specific public key-private key pair.

5. The system of claim 1, wherein the one or more pattern graphs further comprises an edge representative of an attribute between the first shape and a second shape.

6. The system of claim 1 further configured to:
apply a graph-isomorphism function to transform the one or more pattern graphs into one or more unambiguous graphs.

7. The system of claim 6 further configured to:
transform vertex sets of graph G to another graph H, wherein two vertices u and v of G are adjacent in G in circumstances when f(u) and f(v) are adjacent to H, wherein f is a bijection function f: VG→VH.

8. A computer-implemented method for designing an integrated circuit, the computer-implemented method comprising:
receiving the integrated circuit design, wherein the integrated circuit design comprises at least one position in violation of a design rule associated with the integrated circuit design;
identifying one or more design patterns at the at least one violating position;
generating one or more pattern graphs for the one or more design patterns, wherein the one or more pattern graphs comprises a node representative of a first shape associated with the design rule;
extracting a system on chip (SoC) design for transformation into a block graph;
comparing the block graph with each of the one or more pattern graphs to determine whether the at least one violating position is cleared;
in circumstances where a match is found between the block graph and the each of the one or more pattern graphs, changing the one or more design patterns; and
repeating the step of comparing until there is no further match found.

9. The computer-implemented method of claim 8, wherein the SoC design comprises one or more known non-compliant design elements stored in a design rule database to determine whether a non-compliant design element having the at least one violating position is entered.

10. The computer-implemented method of claim 8, wherein identifying the one or more design patterns at the at least one violating position further comprises:
defining a region in the integrated circuit design and setting related variables via a graphical user interface.

11. The computer-implemented method of claim 8, wherein the one or more design patterns and detailed specifications of advanced node design rules are encrypted as an encrypted file using a customer specific public key-private key pair.

12. The computer-implemented method of claim 8, wherein the one or more pattern graphs further comprises an edge representative of an attribute between the first shape and a second shape.

13. The computer-implemented method of claim 8, further comprises:
applying a graph-isomorphism function to transform the one or more pattern graphs into one or more unambiguous graphs.

14. The computer-implemented method of claim 13, wherein applying the graph-isomorphism function to transform the one or more pattern graphs into one or more unambiguous graphs, further comprises:
transforming vertex sets of graph G to another graph H, wherein two vertices u and v of G are adjacent in G in circumstances when f(u) and f(v) are adjacent to H, wherein f is a bijection function f: VG→VH.

15. A non-transitory storage medium comprising instructions which when executed by a processor cause the processor to:
receive an integrated circuit design, wherein the integrated circuit design comprises at least one position in violation of a design rule associated with the integrated design;
identify one or more design patterns at the at least one violating position,
generate one or more pattern graphs for the one or more design patterns, wherein the one or more pattern graphs comprises a node representative of a first shape associated with the design rule;

extract a system on chip (SoC) design for transformation into a block graph;

compare the block graph with each of the one or more pattern graphs to determine whether the at least one violating position is cleared;

in circumstances where a match is found between the block graph and the each of the one or more pattern graphs, change the one or more design patterns; and repeat the step of comparing until there is no further match found.

16. The non-transitory storage medium of claim 15, wherein the SoC design comprises one or more known non-compliant design elements stored in a design rule database to determine whether a non-compliant design element having the at least one violating position is entered.

17. The non-transitory storage medium of claim 15, wherein the instructions further cause the processor to:
define a region in the integrated circuit design and sets related variables via a graphical user interface.

18. The non-transitory storage medium of claim 15, wherein the one or more design patterns and detailed specifications of advanced node design rules are encrypted as an encrypted file using a customer specific public key-private key pair.

19. The non-transitory storage medium of claim 15, wherein the one or more pattern graphs further comprises an edge representative of an attribute between the first shape and a second shape.

20. The non-transitory storage medium of claim 15, wherein the instructions further cause the processor to:
apply a graph-isomorphism function to transform the one or more pattern graphs into one or more unambiguous graphs.

* * * * *